(12) United States Patent
Nath et al.

(10) Patent No.: US 11,117,577 B2
(45) Date of Patent: Sep. 14, 2021

(54) VEHICLE PATH PROCESSING

(71) Applicant: Ford Global Technologies, LLC, Dearborn, MI (US)

(72) Inventors: Nitendra Nath, Troy, MI (US); Michael Hafner, Ann Arbor, MI (US); Aaron L. Mills, Ann Arbor, MI (US); Zhao Wang, Novi, MI (US); Bahgat Aboushaban, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 16/282,428

(22) Filed: Feb. 22, 2019

(65) Prior Publication Data

US 2020/0269837 A1  Aug. 27, 2020

(51) Int. Cl.
*B60W 30/12* (2020.01)
*G06K 9/00* (2006.01)

(52) U.S. Cl.
CPC ......... *B60W 30/12* (2013.01); *G06K 9/00798* (2013.01); *B60W 2520/06* (2013.01); *B60W 2552/30* (2020.02)

(58) Field of Classification Search
CPC ............. B60W 30/12; B60W 2552/30; B60W 2520/06; G06K 9/00798
USPC ........................................................ 701/41
See application file for complete search history.

(56) References Cited

U.S. PATENT DOCUMENTS

| | | |
|---|---|---|
| 8,190,330 B2 | 5/2012 | Lee |
| 8,990,015 B2 | 3/2015 | Citelli |
| 9,567,004 B1 | 2/2017 | Jhang et al. |
| 2013/0200909 A1 | 8/2013 | Rasbornig et al. |
| 2018/0190123 A1 | 7/2018 | Oka |
| 2019/0364492 A1* | 11/2019 | Azizi ............... H04W 4/029 |

FOREIGN PATENT DOCUMENTS

| | | |
|---|---|---|
| WO | 2015106913 A1 | 7/2015 |
| WO | 2018078606 A1 | 5/2018 |

* cited by examiner

*Primary Examiner* — Gertrude Arthur Jeanglaude
(74) *Attorney, Agent, or Firm* — Frank A. MacKenzie; Bejin Bieneman PLC

(57) ABSTRACT

A computer includes a processor and a memory, the memory storing instructions executable by the processor to identify an error between a predicted steerable path of a vehicle based on data collected according to a first protocol and a predicted lane path based on data collected according to a second protocol and to identify a path fault when the error exceeds an error threshold for an elapsed time exceeding a time threshold.

20 Claims, 5 Drawing Sheets

VEHICLE PATH PROCESSING

BACKGROUND

A vehicle can include sensors to collect data of an environment surrounding the vehicle. A computer in the vehicle can use the data to operate the vehicle along a path. Operation of the vehicle along the path can depend on acquiring accurate and timely data regarding a future path while the vehicle is operated on a roadway.

DETAILED DESCRIPTION

Figure 1:
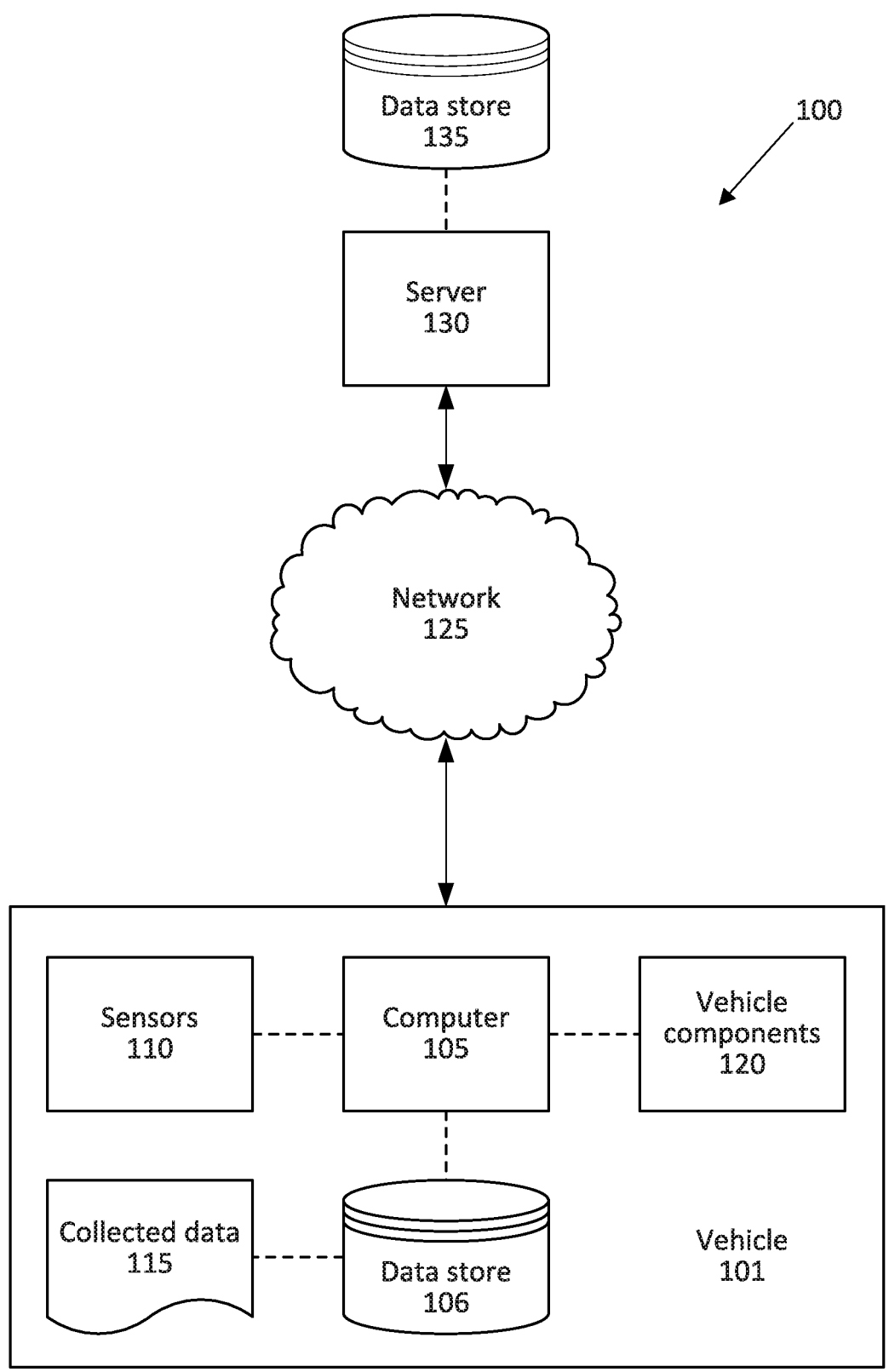
FIG. 1 is a block diagram of an example system for operating a vehicle.

A system includes a computer including a processor and a memory, the memory storing instructions executable by the processor to identify an error between a predicted steerable path of a vehicle based on data collected according to a first protocol and a predicted lane path based on data collected according to a second protocol, and, to identify a path fault when the error exceeds an error threshold for an elapsed time exceeding a time threshold.

The instructions can further include instructions to determine the predicted steerable path based on at least one of a vehicle heading angle, a curvature, or a curvature rate.

The second protocol can include a security measure.

The time threshold can be based on a magnitude of the error.

The instructions can further include instructions to determine the predicted lane path based on at least one of a lane marking, a lane barrier, and a roadway edge.

The instructions can further include instructions to apply a low-pass filter to the predicted steerable path.

The instructions can further include instructions to determine a path offset for the predicted steerable path and a lane offset for the predicted lane path.

The instructions can further include instructions to identify the error based on the path offset and the lane offset.

The instructions can further include instructions to determine the predicted steerable path based on steering data and to determine the lane path based on roadway lane image data.

The instructions can further include instructions to determine the error based on a vehicle speed.

The instructions can further include instructions to, upon identifying the path fault, transition from an autonomous mode to one of a semi-autonomous or a manual mode.

The instructions can further include instructions to, upon identifying the path fault, then to identify no path fault when the error is below the error threshold for an elapsed time greater than a second time threshold.

A method includes identifying an error between a predicted steerable path of a vehicle based on data collected according to a first protocol and a predicted lane path based on data collected according to a second protocol and identifying a path fault when the error exceeds an error threshold for an elapsed time exceeding a time threshold.

The method can further include determining the predicted steerable path based on at least one of a vehicle heading angle, a curvature, or a curvature rate.

The method can further include determining the predicted lane path based on at least one of a lane marking, a lane barrier, and a roadway edge.

The method can further include applying a low-pass filter to the predicted steerable path.

The method can further include determining a path offset for the predicted steerable path and a lane offset for the predicted lane path.

The method can further include identifying the error based on the path offset and the lane offset.

The method can further include determining the predicted steerable path based on steering data and to determine the lane path based on roadway lane image data.

The method can further include determining the error based on a vehicle speed.

The method can further include, upon identifying the path fault, transitioning from an autonomous mode to one of a semi-autonomous or a manual mode.

The method can further include, upon identifying the path fault, then identifying no path fault when the error is below the error threshold for an elapsed time greater than a second time threshold.

A system includes means for identifying an error between a predicted steerable path of a vehicle based on data collected according to a first protocol and a predicted lane path based on data collected according to a second protocol and means for identifying a path fault when the error exceeds an error threshold for an elapsed time exceeding a time threshold.

The system can further include means for determining the predicted steerable path based on at least one of a vehicle heading angle, a curvature, or a curvature rate.

The system can further include means for determining a path offset for the predicted steerable path and a lane offset for the predicted lane path.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A computer in an autonomous vehicle allows a vehicle user to relinquish control of the vehicle while the computer controls lateral and longitudinal motion of the vehicle. The computer monitors the user's awareness and ability to assume manual control of the vehicle.

The computer can determine a travel path to move the vehicle from an origin to a destination. The computer generates a steerable path that follows the travel path. The computer actuates components in the vehicle according to the steerable path to move the vehicle substantially along the travel path.

The computer can generate the steerable path according to a first protocol including a path polynomial. The data used in the first protocol may not include a security measure. To check robustness of the steerable path, the computer can determine a lane path based on lane markings according to a second protocol that includes a security measure, e.g., ASIL-A, ASIL-B, measures in accordance ISO 26262, etc.

The security measure can improve robustness of the lane path, and the computer 105 can incorporate data to determine the lane path that are not used to determine the steerable path.

The computer can determine a difference between the steerable path and the lane path to determine whether the vehicle will deviate from the travel path when following the steerable path. When the difference exceeds a threshold, the computer can determine that the vehicle should no longer follow the steerable path and return at least partial control of the vehicle to the user in a manual or semiautonomous mode. By using the lane path to ensure robustness of the steerable path, the computer can more accurately determine when to remain in the autonomous mode and when to transition control to the user than would otherwise be possible.

FIG. 1 illustrates an example system 100 for operating a vehicle 101. The system 100 includes a computer 105. The computer 105, typically included in the vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
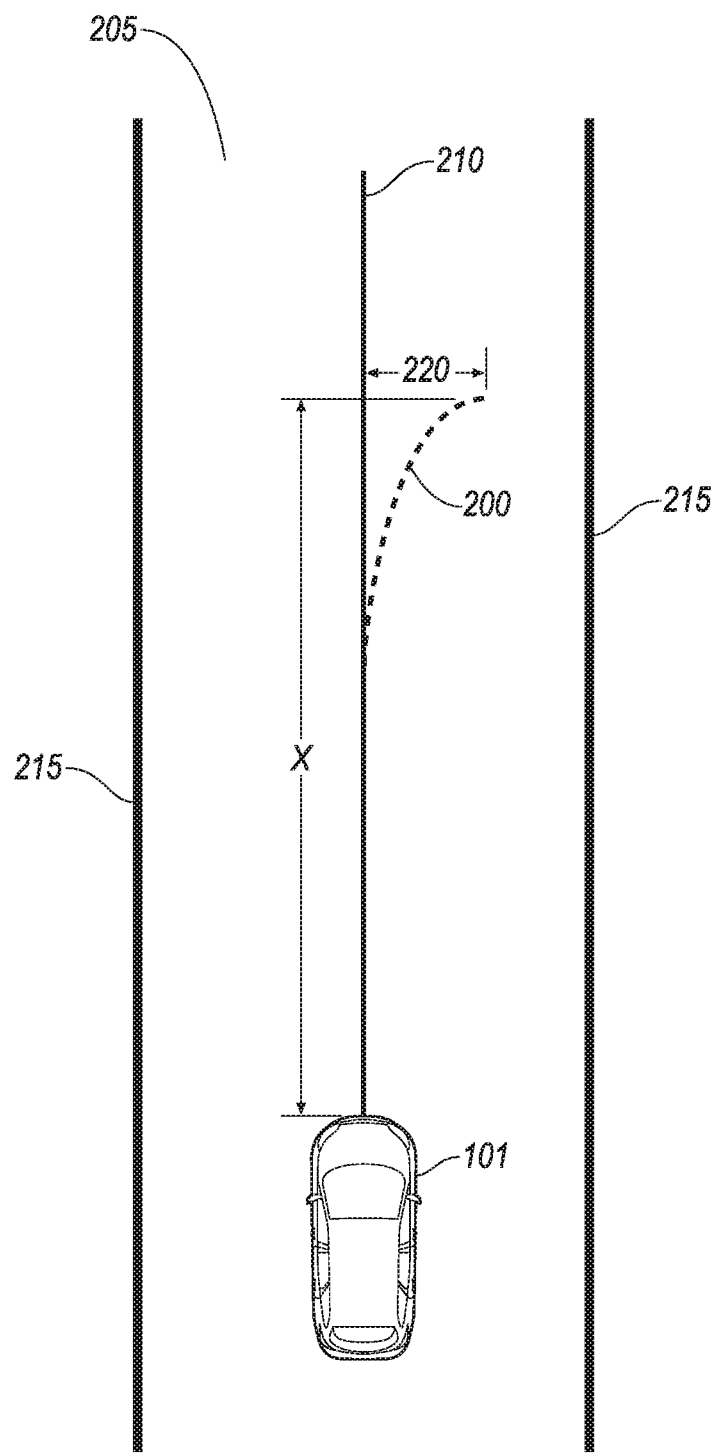
FIG. 2 is a plan view of an example steerable path and an example lane path for the vehicle in an example roadway lane.

FIG. 2 is a view of an example vehicle 101 following a predicted steerable path 200 in a roadway lane 205. In the present context, a "steerable path" is a projected (curved and/or straight) line along which the computer 105 operates components 120 to move the vehicle 101 along a travel path. A "travel path" is a projected (curved and/or straight) navigation line to move the vehicle 101 from an origin to a destination. The computer 105 can determine a lane path 210 of the roadway lane 205. The "lane path" is a projected (curved and/or straight) line between lane edge markings 215 of the roadway lane 205 along which the computer 105 operates components 120 to move the vehicle 101. The lane edge markings 215 can be, e.g., solid painted lines, dashed painted lines, etc. When the steerable path 200 follows the lane path 210, the vehicle 101 remains within the lane edge markings 215 of the roadway lane 205. As described below, the lane path 210 can be determined with additional data 115 that is more robust than the steerable path 200, preventing deviations from the path of travel of the vehicle 101. In the present context, the vehicle 101 moves in a "longitudinal" direction when the vehicle 101 moves forward and backward, and the vehicle 101 moves in a "lateral" direction when the vehicle 101 moves perpendicular to the longitudinal direction, i.e., left and right relative to an occupant in the vehicle 101. A "longitudinal distance" is a distance along the longitudinal direction, and a "lateral distance" is a distance along the lateral direction.

The steerable path 200 may deviate from the lane path 210. That is, the steerable path 200 may move away from the lane path 210, causing the vehicle 101 to move toward one of the lane edge markings 215. The lateral distance between the steerable path 200 and the lane path 210 is an error 220. When the error 220 exceeds an error threshold, the vehicle 101 may move past the lane edge markings 215 and out of the roadway lane 205. The error threshold can be determined based on, e.g., an average distance between an outermost portion of a vehicle 101 and a lane edge marking 215 when the vehicle 101 is moving along the lane path 210. The average distance between the outermost portion of the vehicle 101 and the lane edge marking 215 can be measured based on image data 115 from one or more sensors 110 in the vehicle 101 detecting the lane edge marking 215. That is, the computer 105 can determine the position of the lane edge marking 215 in a vehicle coordinate system and the outermost portion of the vehicle 101 can be a predefined value stored in the data store 106 based on known dimensions of the vehicle 101. In another example, the server 130 can determine the average distance based on geocoordinate data 115 of the vehicle 101, dimensions of the vehicle 101, and geocoordinate data of the lane edge marking 215. In the example of FIG. 2, the roadway lane 205 is substantially straight; therefore, errors 220 may occur when the steerable path 200 curves away from the lane path 210.

Figure 3:
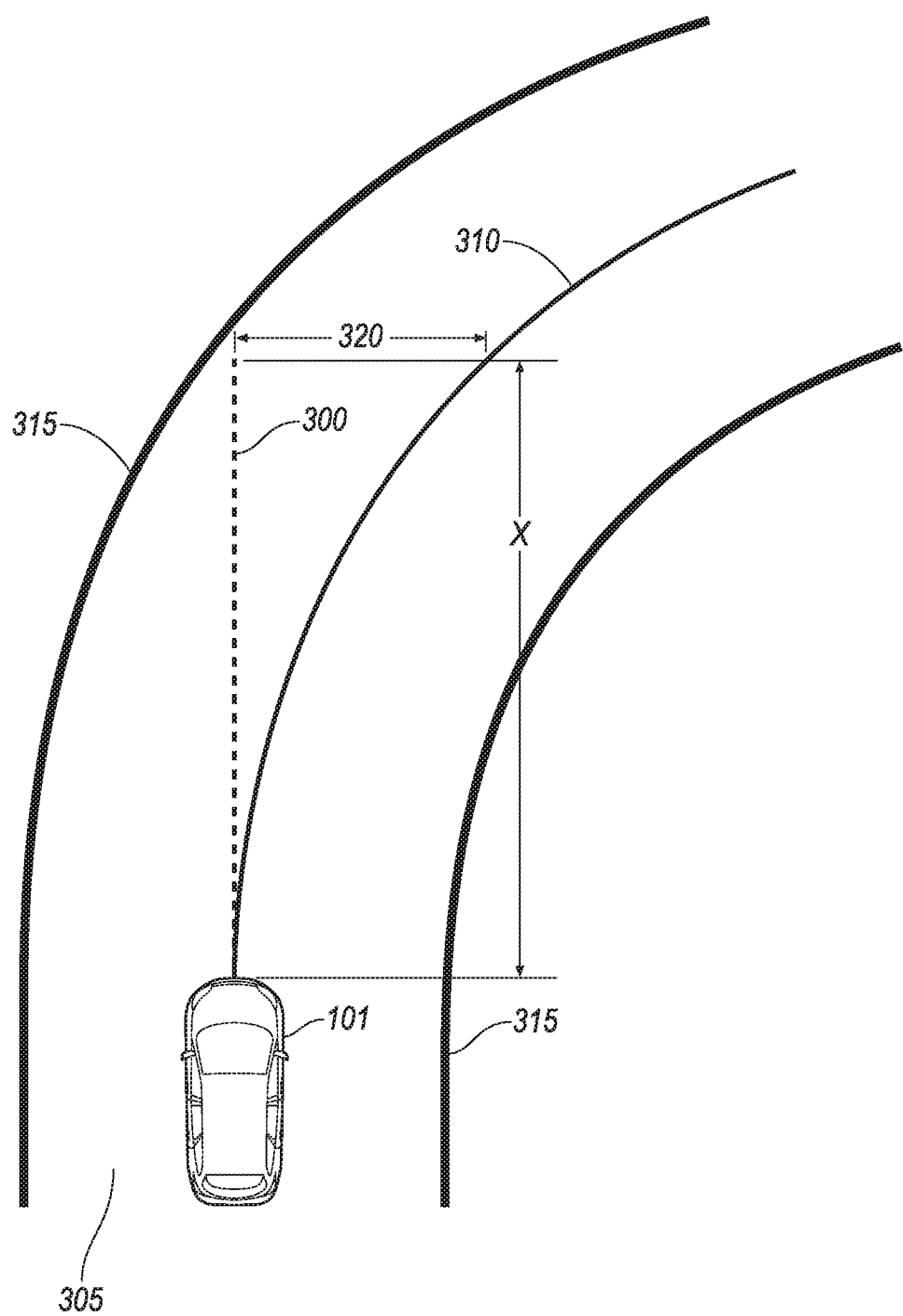
FIG. 3 is a plan view of an example steerable path and an example lane path for the vehicle in an example roadway lane.

FIG. 3 is a view of the vehicle 101 following a steerable path 300 in a curved roadway lane 305. In the example of FIG. 3, an error 320 between the steerable path 300 and a lane path 310 may occur when the steerable path 300 remains straight while the lane path 310 curves, and the vehicle 101 approaches a lane edge marking 315. If the computer 105 follows the steerable path 300, the vehicle 101 will exit the roadway lane 305 in the curve as the vehicle 101 deviates from the lane path 310.

The computer 105 can predict the steerable path 200, 300 of the vehicle 101 with a path polynomial. The path polynomial y(x) is a model that predicts the steerable path 200, 300 as a line traced by a polynomial equation. The path polynomial y(x) predicts the steerable path 200, 300 for a predetermined upcoming distance x, measured in meters:

$$y(x)=a_0+a_1 x+a_2 x^2+a_3 x^3 \qquad (1)$$

where $a_0$ an offset, i.e., a lateral distance between the steerable path 200, 300 and a center line of the vehicle 101 at the upcoming distance x, $a_1$ is a heading angle of the steerable path 200, 300, $a_2$ is the curvature of the steerable path 200, 300, and $a_3$ is the curvature rate of the steerable path 200, 300. For example, techniques for calculating the coefficients $a_0$, $a_1$, $a_2$, $a_3$ can be found in, e.g., U.S. patent application Ser. No. 15/783,900, titled "IN-VEHICLE TRAFFIC ASSIST", filed on Oct. 13, 2017; Ser. No. 15/873, 997, titled "LANE CENTERING DISURBANCE MITIGATION," filed on Jan. 18, 2018; Ser. No. 16/085,495, titled "VEHICLE LATERAL MOTION CONTROL," filed Aug. 8, 2018; and Ser. No. 16/217,227, titled "VEHICLE PATH PROCESSING", filed on Dec. 12, 2018; each of which is hereby incorporated by reference in its entirety. In the present context, the "upcoming distance" x is a predetermined longitudinal distance in front of the vehicle 101 from a front bumper of the vehicle 101 at which the sensors 110 collect data 115 and the computer 105 predicts the steerable path 200, 300. The upcoming distance x can be determined based on, e.g., a current speed of the vehicle 101, a predetermined time threshold, determined based on empirical simulation data, a detection range of the sensors 110, etc. The time threshold can be, e.g., 1 second.

The computer 105 can determine the offset of the path polynomial y(x), which is the coefficient $a_0$. The computer 105 can determine a center line of the vehicle 101 along the steerable path 200, 300 at the upcoming distance x. The computer 105 can determine the offset based on the lateral distance, i.e., the distance perpendicular to the forward longitudinal direction of the vehicle 101, between the center line of the vehicle 101 along the steerable path 200, 300 and the travel path at the upcoming distance x.

The computer 105 can determine the heading angle of the path polynomial y(x), which is the coefficient $a_1$. The heading angle is a predicted angle defined between the center line of the vehicle 101 and the travel path at the upcoming distance x measured in radians with a heading of zero radians equal to a straight direction, i.e., movement of the vehicle 101 when a steering wheel is in a neutral position.

The computer 105 can determine the curvature of the path polynomial y(x), which is the coefficient $a_2$. The curvature measures deviation of the path polynomial y(x) from a straight line measured in inverse meters $m^{-1}$. The travel path between the vehicle 101 and the upcoming distance x defines a circular arc, and the computer 105 can define a circle based on the arc. A radius of the circle defined by the arc is the curvature. The computer 105 can determine the curvature at the upcoming distance x based on, e.g., conventional curve approximation techniques.

The computer 105 can determine a curvature rate of the path polynomial y(x), which is the coefficient $a_3$. The curvature rate is a rate of change of the curvature, as described above, and is measured in inverse square meters $m^{-2}$. The computer 105 can determine the curvature rate based on data 115 collected by the sensors 110. For example, the computer 105 can determine the curvature of the travel path for the upcoming distance x and for a set of distances [$x-\Delta x$, $x+\Delta x$] that are $\Delta x$ around the distance x, and the computer 105 can use numerical differentiation methods (e.g., Newton's difference quotient) to determine the curvature rate.

The computer 105 can include programming to actuate sensors 110 to collect data 115 for the lateral distance, the heading angle, the curvature, and the curvature rate. The programming is a "Steerable Path Polynomial" (SPP) feature. According to SPP, the computer 105 collects data 115 according to a protocol without a security measure, e.g., end-to-end protection, ISO 26262, etc., such as a Quality Management ("QM") protocol. As used here, a "security measure" is encryption and/or other robustness measures that ensure quality of data 115 transmitted according to the protocol. That is, during transmission of the data 115 from the sensors 110 to the computer 105, electronic interference can alter some of the data 115, rendering the altered data 115 inaccurate for use by the computer 105. The "robustness" of the data 115 is the quality of the data 115, i.e., the amount, e.g., percentage, of data 115 collected by the sensors 110 that remains unchanged upon transmission to the computer 105. A "robustness measure" is programming that maintains quality of data 115 transmitted from the sensor 110 to the computer 105. For example, in addition or as an alternative to encryption, the security measure can include specified data collection and filtering algorithms that ensure that data 115 transmitted to the computer 105 is not lost, altered, or otherwise inaccurate from the data 115 collected by the sensors 110. Thus, the robustness, i.e., the quality, of the data 115 can be improved with the security measure. In another example, the security measure can include redundant data collection algorithms that each process the same data 115. If the redundant algorithms produce the same result, the computer 105 can determine that the received data 115 are robust. If the redundant algorithms produce different results, the computer 105 can arbitrate between the results and determine that one or more of the redundant algorithms does not produce robust data 115.

In another example, the security measure can be a checksum, i.e., an algorithm that receives a specific string of data 115, converts the string to a number, and compares the number to a predetermined value, the predetermined value determined based on converting the string with the checksum prior to transmission. Thus, if data 115 are lost during transmission, the converted string would generate a number different from the predetermined value, and the computer 105 can determine that the data 115 are of lower quality. The SPP feature can predict the steering path 200, 300 based on steering data 115, i.e., data 115 from a steering component 120. The SPP feature can quickly determine the steerable path 200, 300 and allow the computer 105 to actuate components 120 to move the vehicle 101 along the steerable path 200, 300.

The computer 105 can predict the lane path 210, 310 with the path polynomial y(x) of Equation 1. The computer 105 can determine respective coefficients $a_0, a_1, a_2, a_3$ for the lane path 210, 310 based on data 115 collected by sensors 110. The computer 105 can predict the lane path 210, 310 based on programming of a "Lane Prediction Polynomial" (LPP) feature. The LPP feature collects data 115 according to a protocol with a security measure, e.g., an ASIL-B protected signal with a checksum and/or counter for robustness and security in accordance with ISO 26262, an ASIL-A protected signal, etc. Thus, with the security measure, the LPP feature can identify deviations of the vehicle 101 from the travel path that the SPP feature may not identify with regard to the steerable path 200, 300. The LPP feature can predict the lane path 210, 310 based on image data 115 of the roadway lane 205, 305 e.g., images of a lane edge marking 215, 315, a lane barrier, an edge of a roadway, etc.

The computer 105 can determine a lane offset for the predicted lane path 210, 310. The "lane offset" is the lateral distance between the travel path and a center line of the vehicle 101 along the lane path 210, 310 as determined based on the coefficient $a_0$ of the path polynomial of Equation 1. Based on the lane offset, the computer 105 can determine whether the vehicle 101 will deviate from the lane path 210, 310.

The computer 105 can apply a low-pass filter to the data 115 used by the SPP and LPP features. As used herein, a "low-pass filter" is programming to accept as input a raw signal and to output a filtered signal including only frequencies below a specified threshold. The threshold can be determined to remove variations caused by outlier data 115 that can skew the steerable path 200, 300 and the lane path 210, 310. The threshold can be determined based on simulation testing of simulated steerable paths 200, 300 and lane paths 210, 310, and each coefficient $a_0, a_1, a_2, a_3$ can have a respective threshold. An example threshold for the coefficient $a_0$ is 0.2 meters.

The computer 105 can identify an error 220, 320 between the predicted steerable path 200, 300 and the predicted lane path 210, 310. The "error" is the deviation of the steerable path 200, 300 from the lane path 210, 310 measured in units of distance, e.g., meters. The computer 105 can identify the error 220, 320 as, e.g., the difference between the steerable path 200, 300 determined by the path polynomial $y_{path}$ and the lane path 210, 310 determined by the path polynomial $y_{lane}$:

$$\text{error} = |y_{path} - y_{lane}| \quad (2)$$

where the vertical bars specify an absolute value, resulting in a positive value for the error 220, 320. When the error 220, 320 exceeds an error threshold, the vehicle 101 can deviate from the travel path and leave the roadway lane 205, 305, and the computer 105 can actuate one or more components 120 to prevent the vehicle 101 from deviating from the travel path.

The computer 105 can identify a path fault. In the present context, a "path fault" is an indication that the error 220, 320 between the steerable path 200, 300 and the lane path 210, 310 is severe enough that the vehicle 101 will exit the roadway lane 205, 305 if the fault is not remediated. Upon exceeding the error threshold, the computer 105 can initiate a timer to measure an elapsed time since the error threshold was exceeded. The computer 105 can identify the path fault when the elapsed time exceeds a time threshold, the time threshold determined based on, e.g., empirical testing and/or simulation modeling of likelihood of errors 220, 320 causing the vehicle 101 to exit roadway lanes 205, 305.

The time threshold can be based on a magnitude of the error 220, 320. As the error 220, 320 increases, the time threshold can decrease, indicating that larger errors 220, 320 can be more severe and require more immediate intervention by the computer 105. The data store 106 and/or the server 130 can include a look-up table or a correlation that provides a time threshold for a specific magnitude of the error 220, 320. The look-up table and/or the correlation can be determined based on a predicted time for the vehicle 101 to leave the roadway lane 205, 305. For example, the look-up table and/or the correlation can be determined based on simulations of vehicles 101 following specified steerable paths 200, 300 and lane paths 210, 310. In the simulations, specified errors 220, 320 can be introduced, and the time for the vehicle 101 to exit the roadway lane 205, 305 can be determined for each specified error 220, 320. Thus, the time threshold can be determined for a specified magnitude of error 220, 320 such that the time threshold is less than the elapsed time for the vehicle 101 to leave the roadway lane 205, 305.

Upon identifying the path fault, the computer 105 can transition from an autonomous mode to one of a semi-autonomous or a manual mode. Because the path fault can indicate that the vehicle 101 is about to exit the roadway lane 205, 305, the computer 105 can return control of the vehicle 101 to the user. For example, the computer 105 can transition from the autonomous mode to the semi-autonomous mode, returning control of a steering component 120 to the user. The computer 105 can determine a ramp-out torque for the vehicle 101 to ramp the vehicle 101 out of the autonomous mode and into one of the semi-autonomous or manual modes. The "ramp-out" torque is a prescribed change of torque to which the computer 105 actuate the steering component 120 to reduce control of the steering component 120 by the computer 105 until the user assumes manual control of the vehicle 101. That is, the ramp-out torque reduces the torque applied to the steering component 120 by the computer 105 over a specified period of time, allowing the user to provide torque via, e.g., a steering wheel. For example, the computer 105 can reduce the torque linearly by 15 N-m/s until the torque provided by the computer 105 is zero. The ramp-out torque can be determined based on, e.g., empirical testing of an average time for the user to assume manual control of the vehicle 101 and an amount of torque that the computer 105 can reduce based on the average time.

After identifying the path fault, the computer 105 can continue to determine the error 220, 320 between the steerable path 200, 300 and the lane path 210, 310. If the error 220, 320 is below the error threshold, the computer 105 can determine that the vehicle 101 is no longer in danger of deviating from the lane path 210, 310. The computer 105 can identify that there is no path fault when the error 220, 320 is below the error threshold for an elapsed time greater than a second time threshold, the second time threshold determined based on, e.g., empirical testing of an amount of time for the vehicle 101 to return to the lane path 210, 310 without exiting the roadway lane 205, 305.

Figure 4:
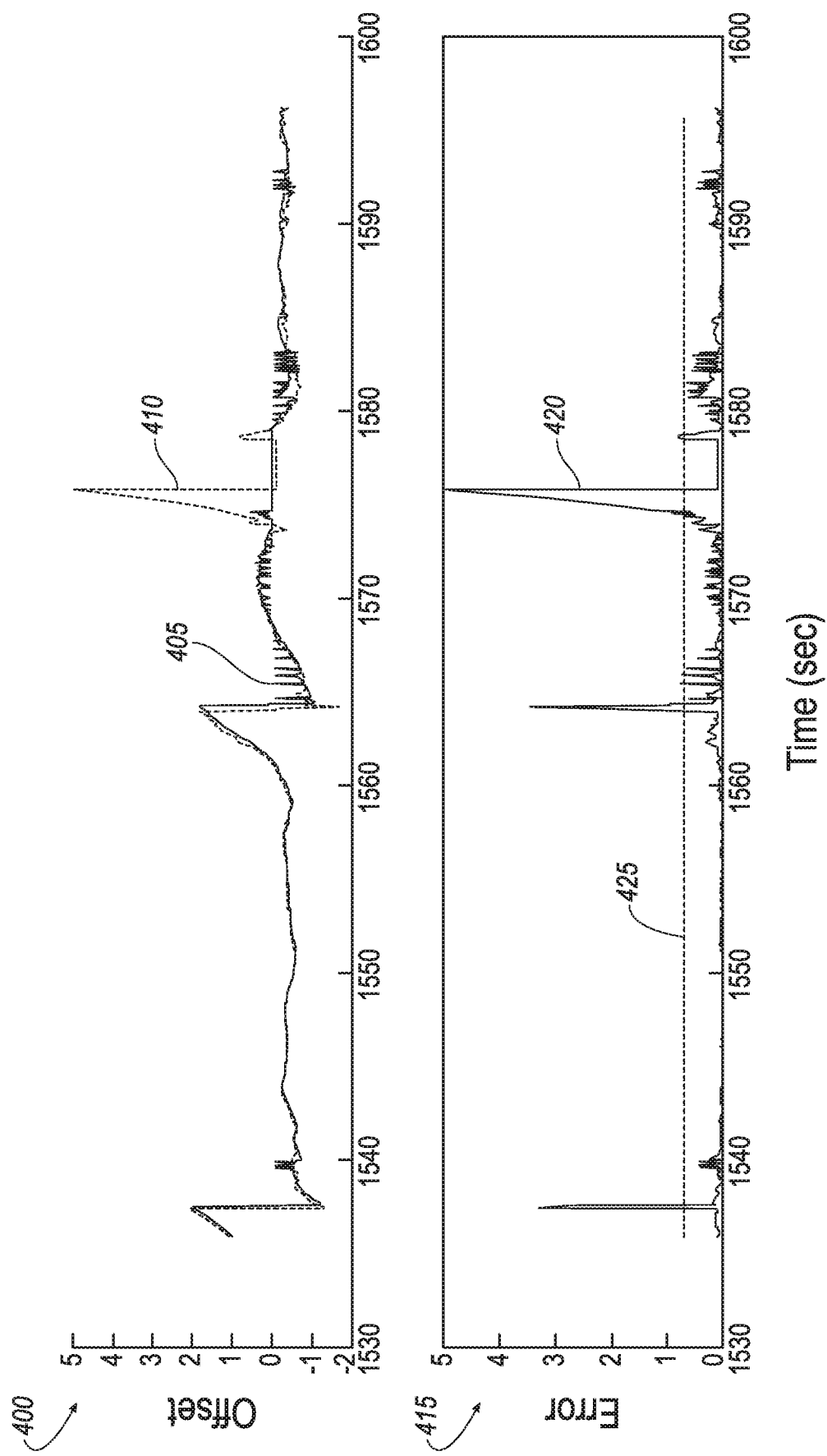
FIG. 4 is a diagram of example errors from an example steerable path and an example lane path.

FIG. 4 illustrates example charts of the path offset and the lane offset. A chart 400 shows the offset coefficient $a_0$ for the steerable path 200, 300 represented as an offset 405 in a solid line, and for the lane path 210, 310 represented as an offset 410 in a dashed line. The vertical axis is the magnitude of the respective offset. The horizontal axis is time in seconds. In the example of FIG. 4, the time period for which the offsets 405, 410 are shown is from 1530-1600 seconds during the route along which the vehicle 101 travels.

As shown in the chart 400, the offset 405 for the steerable path 200, 300 is substantially the same as the offset 410 for the lane path 210, 310. However, between timestamps 1570 and 1580 seconds, the offset 410 increases while the offset 405 does not, indicating that the lane path 210, 310 predicts a deviation of the vehicle 101 from the lane path 210, 310 that the steerable path 200, 300 does not predict. Because the lane path 210, 310 is determined based on a LPP feature that includes a security measure, the data 115 used in the LPP can be more robust, i.e., more reliable, than data 115 used to determine the steerable path 200, 300 with the SPP feature. Thus, the lane path 210, 310 can identify deviations that the steerable path 200, 300 may miss, as shown in the increase in the offset 410 relative to the offset 405.

A chart 415 shows the error 220, 320 determined by the computer 105. The error 220, 320 is represented as an error line 420 in a solid line, and an error threshold is represented as a threshold line 425 in a dashed lien. The vertical axis is a magnitude of the error 220, 320. The horizontal axis is time in seconds.

As shown in the chart 415, the error line 420 generally stays below the threshold line 425 because the offsets 405, 410 are substantially the same. The error line 420 exceeds the threshold line 425 a few times, typically when the offsets 405, 410 change suddenly and a time lag between the offsets 405, 410 produces a few time steps at which the error line 420 exceeds the threshold line 425. However, between the timestamps at 1570 and 1580 seconds, the error line 420 exceeds the threshold line 425 and stays above the threshold line 425 for more than a few time steps. The increased error line 420 represents the differences in the offsets 405, 410 shown in the chart 400 resulting from the lane path 210 identifying a deviation that the steerable path 200, 300 did not. The time threshold can be determined such that the error line 420 increases between the 1530-1540 timestamps and 1560-1570 timestamps would not trigger a path fault but the error line 420 increase between the 1570-1580 timestamps would trigger a path fault.

Figure 5:
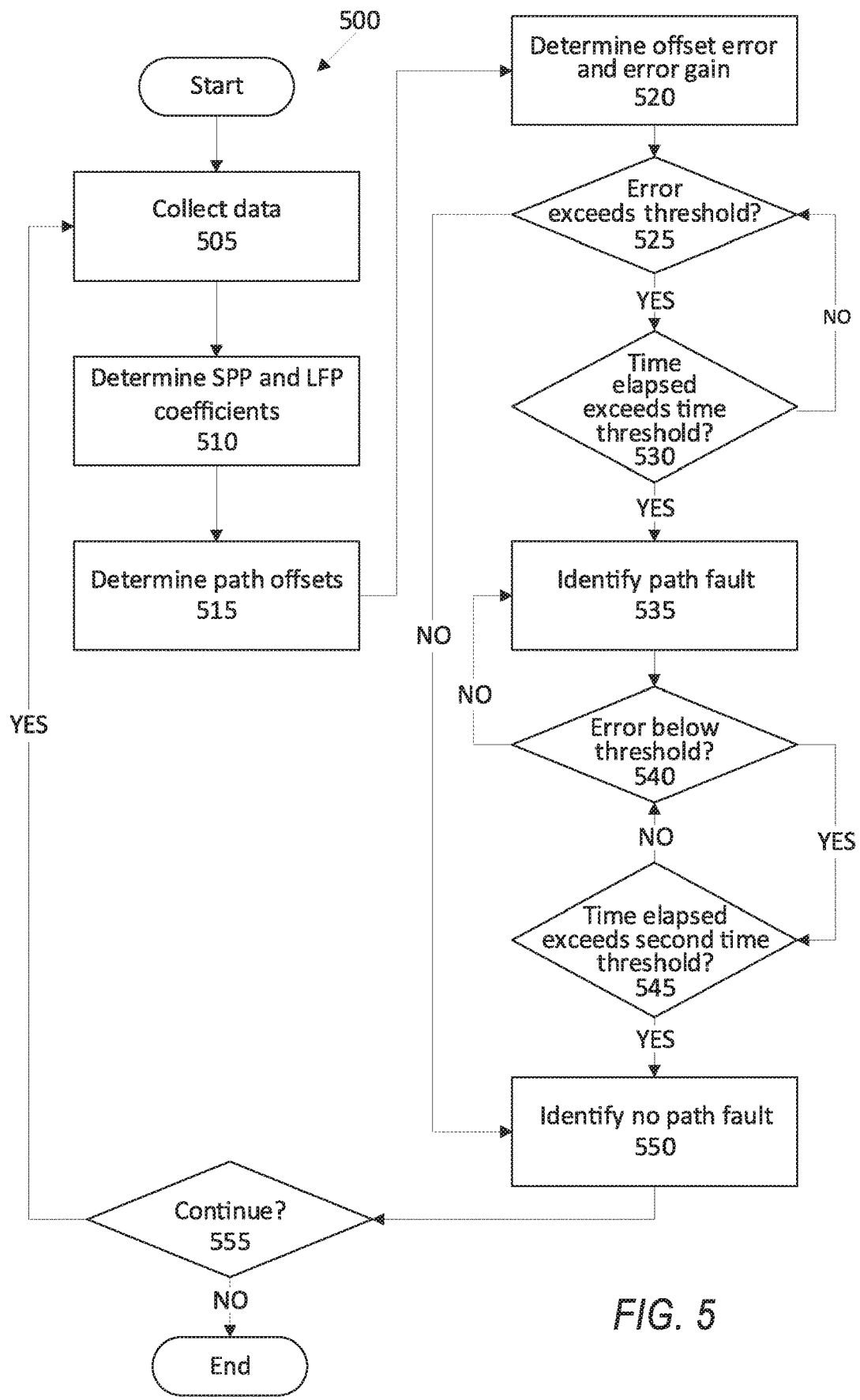
FIG. 5 is a diagram of an example process for operating the vehicle.

FIG. 5 is a diagram of an example process for operating a vehicle 101. The process 500 begins in a block 505, in which the computer 105 collects data 115 from one or more sensors 110. The computer 105 can collect data 115 of, e.g., images of a roadway lane 205, 305, a lane edge, a lane edge marking 215, 315, etc.

Next, in a block 510, the computer 105 determines respective coefficients $a_0, a_1, a_2, a_3$ for path polynomials $y(x)$ according to SPP and LPP features. As described above, the SPP feature and the LPP feature can each determine coefficients for the path polynomial based on data 115 collected according to the respective feature and the intended travel path.

Next, in a block 515, the computer 105 determines a path offset and a lane offset. The path offset is the lateral distance, i.e., the distance perpendicular to the forward longitudinal direction of the vehicle 101, between the travel path and a center line of the vehicle 101 along the steerable path 200, 300. The lane offset is the lateral distance between the travel path and the center line of the vehicle 101 along the lane path 210, 310. The computer 105 can determine the path offset and the lane offset by determining the linear coefficient $a_0$ of the respective path polynomial $y(x)$ used to determine the steerable path 200, 300 and the lane path 210, 310. As described above, the linear coefficient $a_0$ is the lateral distance between the center line of the vehicle 101 along the path polynomial $y(x)$ and the travel path at the upcoming longitudinal distance x.

Next, in a block 520, the computer 105 determines the error 220, 320. As described above, the error 220, 320 is the difference between the steerable path 200 and the lane path 210 as determined by respective path polynomials $y_{path}$ and $y_{lane}$.

Next, in a block 525, the computer 105 determines whether the error 220, 320 is above an error threshold. The error threshold can be determined based on a predicted distance that the vehicle 101 might deviate from the lane path 210 until exiting the roadway lane. For example, the error threshold can be an average distance between an outermost portion of a vehicle 101 and a lane edge marking 215, 315 when the vehicle 101 is moving along the lane path 210, 310, e.g., 0.9 meters for a roadway lane that is 3.7 meters wide and a vehicle 101 that is 1.9 meters wide. If the error 220, 320 is above the error threshold, the process 500 continues in a block 530. Otherwise, the process 500 continues in a block 550.

In the block 530, the computer 105 determines whether an elapsed time since the error exceeded the error threshold exceeds a time threshold. The time threshold can be determined based on, e.g., empirical simulation data of vehicles 101 traveling along simulated steerable paths 200, 300 and lane paths 210, 310, a detection range of the sensors 110, etc. For example, upon performing empirical testing and/or simulation modeling of likelihoods of errors 220, 320 for a plurality of vehicles 101 traveling along simulated steerable paths 200, 300 and lane paths 210, 310, the time threshold can be determined as an average time for the vehicle 101 to exit roadway lanes 205, 305. Additionally or alternatively, the time threshold can decrease as a magnitude or amount of the error 220, 320 increases, as described above. The time threshold can be, e.g., 1 second. If the elapsed time exceeds the time threshold, the process 500 continues in a block 535. Otherwise, the process 500 returns to the block 525.

In the block 535, the computer 105 identifies a path fault. Upon identifying the path fault, the computer 105 can actuate one or more components 120 to ensure that the vehicle 101 remains in the roadway lane 205, 305 and/or along the travel path. For example, the computer 105 can transition from an autonomous mode to a semi-autonomous or a manual mode to provide control of the vehicle 101 to a user.

Next, in a block 540, the computer 105 determines an updated error 220, 320 and determines whether the updated error 220, 320 is below the error threshold. As described above, the vehicle 101 can correct movement along the steerable path 200, 300 such that the vehicle 101 will return to the lane path 210, 310. If the error 220, 320 is below the error threshold, the process 500 continues in a block 545. Otherwise, the process 500 continues returns to the block 535.

In the block 545, the computer 105 determines whether an elapsed time since the error 220, 320 was determined to be below the error threshold exceeds a second time threshold. The second time threshold can be determined based on, e.g., empirical testing of an amount of time for the vehicle 101 to return to the lane path 210, 310 without exiting the roadway lane 205, 305. If the elapsed time exceeds the second time threshold, the process 500 continues in the block 550. Otherwise, the process 500 returns to the block 540.

In the block 550, the computer 105 identifies no path fault, i.e., the vehicle 101 is not likely to deviate from the travel path based on the error 220, 320 between the steerable path 200, 300 and the lane path 210, 310. Upon identifying no path fault, the computer 105 continues to operate the vehicle 101 according to the steerable path 200, 300.

Next, in a block 555, the computer 105 determines whether to continue the process 500. For example, the computer 105 can determine to continue the process 500 when the vehicle 101 is still in motion and traveling along the roadway lane 205, 305. In another example, the computer 105 can determine not to continue the process 500 when the computer 105 transitions the vehicle 101 to the manual mode. If the computer 105 determines to continue, the process 500 returns to the block 505 to collect data 115. Otherwise, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
    identify an error between a predicted steerable path of a vehicle based on data collected according to a first protocol and a predicted lane path based on data collected according to a second protocol; and identify a path fault of the predicted steerable path when the error exceeds an error threshold for an elapsed time exceeding a time threshold.

2. The system of claim 1, wherein the instructions further include instructions to determine the predicted steerable path based on at least one of a vehicle heading angle, a curvature, or a curvature rate.

3. The system of claim 1, wherein the second protocol includes a security measure.

4. The system or claim 1, wherein the time threshold is based on a magnitude of the error.

5. The system of claim 1, wherein the instructions further include instructions to determine the predicted lane path based on at least one of a lane marking, a lane barrier, and a roadway edge.

6. The system of claim 1, wherein the instructions further include instructions to apply a low-pass filter to the predicted steerable path.

7. The system of claim 1, wherein the instructions further include instructions to determine a path offset for the predicted steerable path and a lane offset for the predicted lane path.

8. The system of claim 7, wherein the instructions further include instructions to identify the error based on the path offset and the lane offset.

9. The system of claim 1, wherein the instructions further include instructions to determine the predicted steerable path based on steering data and to determine the lane path based on roadway lane image data.

10. The system of claim 1, wherein the instructions further include instructions to determine the error based on a vehicle speed.

11. The system of claim 1, wherein the instructions further include instructions to, upon identifying the path fault, transition from an autonomous mode to one of a semi-autonomous or a manual mode.

12. The system of claim 1, wherein the instructions further include instructions to, upon identifying the path fault, then to identify no path fault when the error is below the error threshold for an elapsed time greater than a second time threshold.

13. A method executable by a computer, comprising:
identifying an error between a predicted steerable path of a vehicle based on data collected according to a first protocol and a predicted lane path based on data collected according to a second protocol;
identifying a path fault of the predicted steerable path when the error exceeds an error threshold for an elapsed time exceeding a time threshold; and
upon identifying the path fault, transitioning from an autonomous mode to one of a semi-autonomous or a manual mode.

14. The method of claim 13, further comprising determining the predicted steerable path based on at least one of a vehicle heading angle, a curvature, or a curvature rate.

15. The method of claim 13, wherein the time threshold is based on a magnitude of the error.

16. The method of claim 13, further comprising determining a path offset for the predicted steerable path and a lane offset for the predicted lane path.

17. A system, comprising:
means for identifying an error between a predicted steerable path of a vehicle based on data collected according to a first protocol and a predicted lane path based on data collected according to a second protocol; and
means for identifying a path fault of the predicted steerable path when the error exceeds an error threshold for an elapsed time exceeding a time threshold.

18. The system of claim 17, further comprising means for determining the predicted steerable path based on at least one of a vehicle heading angle, a curvature, or a curvature rate.

19. The system of claim 17, wherein the time threshold is based on a magnitude of the error.

20. The system of claim 17, further comprising means for determining a path offset for the predicted steerable path and a lane offset for the predicted lane path.

* * * * *